May 29, 1962  R. K. SCHLOSSER, JR., ET AL  3,036,375
METHOD OF MOUNTING MACHINES
Filed May 14, 1959  2 Sheets-Sheet 1
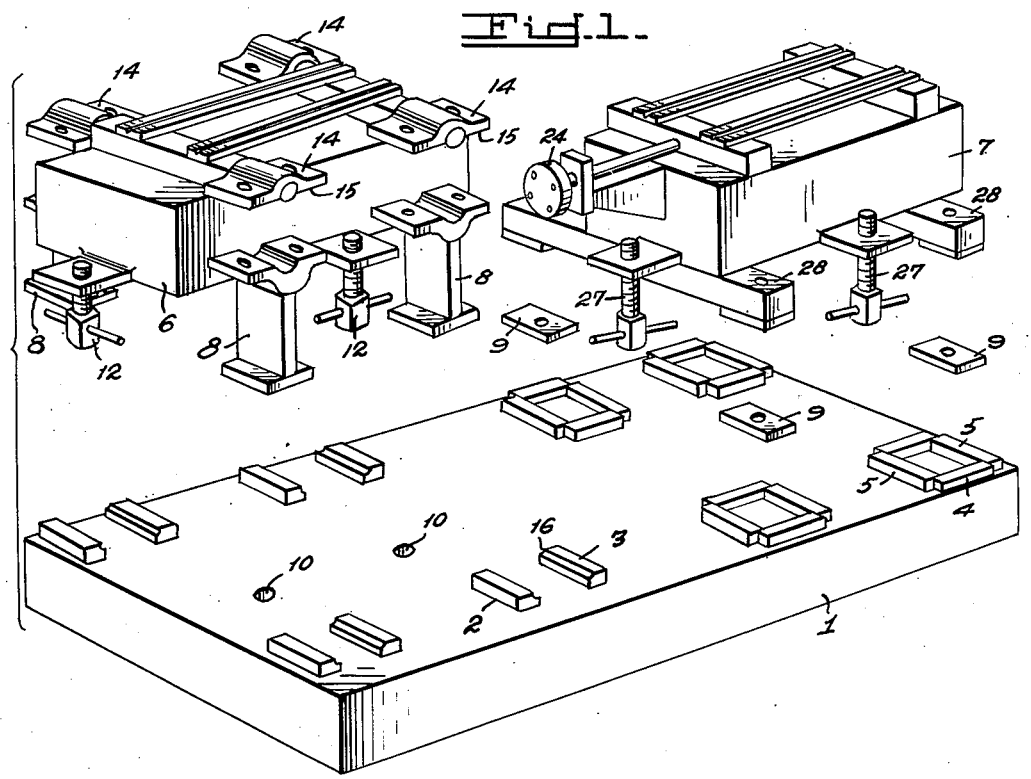
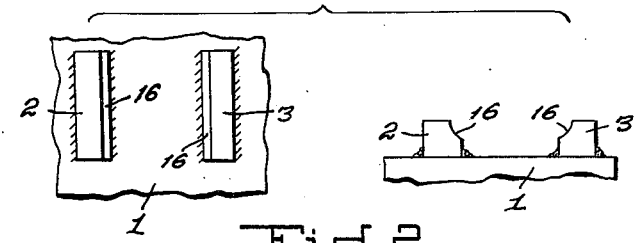
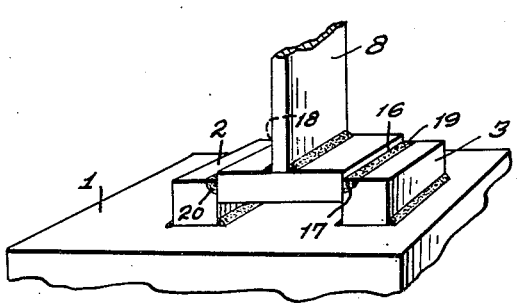
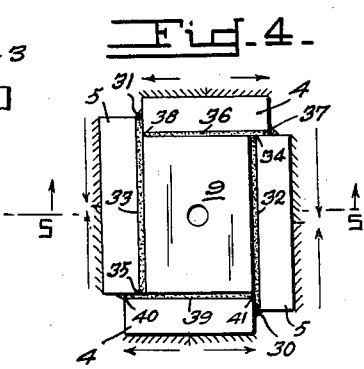
INVENTORS
WERNER C. COHN
RUSSELL K. SCHLOSSER, JR.
BY Vernon F. Kalb,
atty.

May 29, 1962  R. K. SCHLOSSER, JR., ET AL  3,036,375
METHOD OF MOUNTING MACHINES
Filed May 14, 1959  2 Sheets-Sheet 2
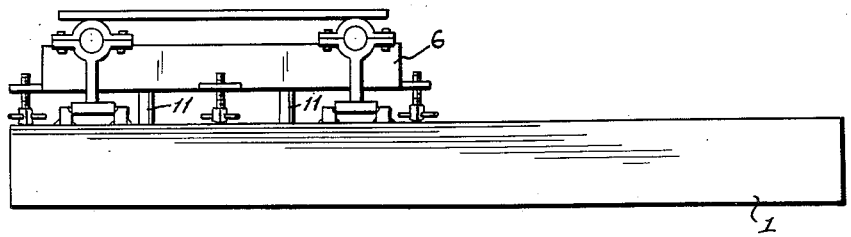
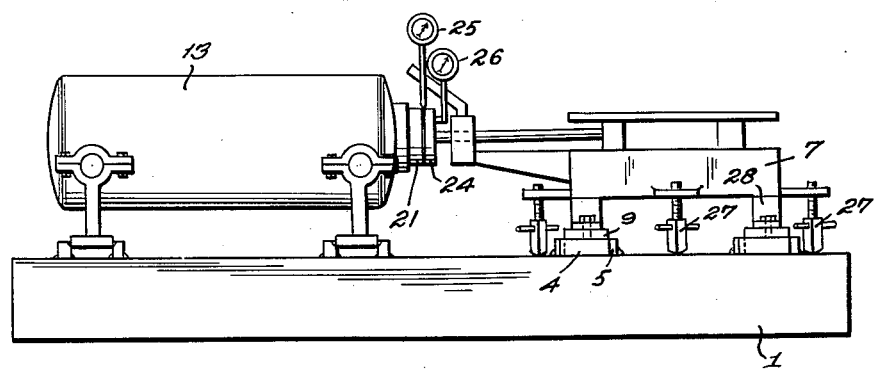
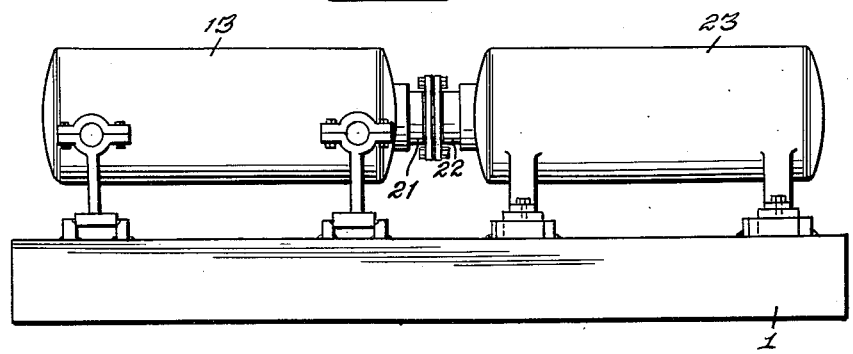
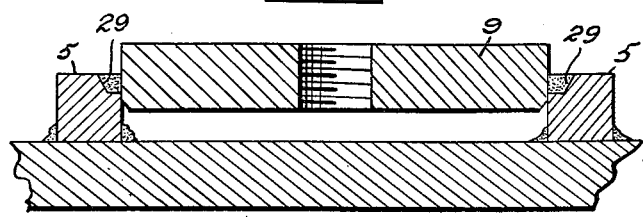
INVENTORS
WERNER C. COHN
RUSSELL K. SCHLOSSER, JR.
BY Vernon F. Kalb
atty.

United States Patent Office 3,036,375
Patented May 29, 1962

3,036,375
METHOD OF MOUNTING MACHINES
Russell K. Schlosser, Jr., Erie, and Werner C. Cohn, Monroeville, Pa., assignors to General Electric Company, a corporation of New York
Filed May 14, 1959, Ser. No. 813,145
8 Claims. (Cl. 29—467)

Our invention relates to a method of mounting machines on a platform and, more particularly, to a method of mounting relatively heavy machines which are subject to accurate positioning tolerances on a platform which has an uneven support surface.

It is frequently necessary to mount two or more machines on a single platform in such a manner that the machines are accurately aligned, so that rotating shafts on the respective machines may be coupled together without danger of excessive vibration, such as would result from a slight misalignment. To achieve such accurate alignment it is necessary to mount each machine on the platform in a predetermined aligned position, within given tolerance distances. It has been a common practice, heretofore, when mounting machines on a platform, to provide the machines with legs that are machined to a common plane, then to weld a plurality of metal blocks to the uneven support surface of the platform, and machine these blocks to a predetermined common plane. After the blocks have been machined to a common plane, the machines are placed on them and are thus mounted, within given machining tolerance distances, in a predetermined common plane. This mounting method is very expensive and time-consuming, because it requires either a very large planing machine that can machine all of the blocks to a common plane in a single planing operation, or a small planing machine that must be moved from block to block to perform the individual planing operations successively. Of course, when the planing machine is moved, it results in an expenditure of time to reposition it at each new planing location, because the machine must be accurately aligned with relation to each preceding position.

An alternative mounting method, that has been less frequently used because it results in a support that tends not to be permanently rigid, comprises machining the support surfaces on a plurality of metal blocks to a plane surface, supporting the machined blocks above a mounting platform in such a manner that their machined surfaces lie in a predetermined common plane, welding the blocks to the platform, mounting a machine on the blocks, and then inserting shims between the blocks and the machine to compensate for the deflection of the blocks from the predetermined common plane which is caused by the heat stresses resulting from the welding operation. This method is less expensive than the planing method, but it results in a less desirable type of support, because the shims tend to vibrate out of the joint and thus cause the machines to become misaligned during use.

A solution to all of the above-mentioned problems is provided by our mounting method which both eliminates the need for shims between the machine and the support members, by providing a rigid welded joint between these members and the machine and, also, allows all necessary machining operations to be performed on the respective members prior to the time they are mounted on a platform, so that they may be moved to a fixed planing machine rather than requiring an expensive movable planing machine that has to be accurately positioned and repositioned above each block on a mounting platform for each separate planing operation.

Accordingly, one object of our invention is to provide a method of mounting machines in a predetermined position on a platform in a manner that is both less expensive and more accurate than any mounting method heretofore known, and in a manner that results in a permanently rigid support.

Another object of our invention is to provide an accurate mounting method for machines in which the support surfaces of all machine supporting parts may be machined as subassemblies, thus eliminating the need for spectial expensive planing machines that must be adapted to machine the support surfaces of the parts after they are mounted in assembled position.

Other objects and advantages of our invention will become apparent from the description that follows:

Briefly stated, in accordance with one form of our mounting method, we provide means for supporting a plurality of prefabricated detachable machine legs, exactly leveled or in a predetermined position, above a mounting platform. Then we initially provide at each leg a "slip joint" between freely movable blocks placed upon the platform in juxtaposition to the terminal sides of the platform end of each leg to allow for vertical adjustment between the respective legs and the associated blocks. Following the establishment of the proper relationship between the blocks and the leg sides, the respective blocks are welded to the platform and at least two sides of each leg are welded to the associated blocks thereby rigidly to support the legs in the predetermined position first established. The welding sequence we use to weld the legs to the blocks is carefully controlled so that the legs are not moved more than a given tolerance distance out of the predetermined position by the heat stresses resulting from the welding operation. We then fasten machines, which have machined support surfaces on the prefabricated legs, to the legs, and thus accurately mount the machines in predetermined positions on the platform.

While our invention is clearly defined in the claims which form a part of the specification, we feel that the invention may be more readily understood by reference to the following description taken in connection with the accompanying drawings in which:

FIG. 1 is a perspective, partially exploded, view of a machine mounting platform, detachable machine legs, and fixtures for supporting the legs in a predetermined position above the platform.

FIG. 2 is a perspective view of a prefabricated machine leg welded to metal blocks which in turn are welded to the mounting platform.

FIG. 3 includes a top view and an end view of the metal blocks shown in FIG. 2.

FIG. 4 is a top view of four metal blocks welded to a mounting platform to form a rigid base to which a machine leg is welded.

FIG. 5 is an end view of the metal blocks and machine leg shown in FIG. 4, taken in section along the plane 5—5 indicated in FIG. 4.

FIGS. 6 through 8 illustrate a sequence of successive steps that may be employed to mount two machines on a platform.

A mounting method illustrative of our invention will be described in connection with the mounting of the separate units of a motor-generator set so as to position the rotatable shafts of the separate units in proper operating axial alignment. Referring to FIG. 1, a mounting platform 1, having a plurality of metal blocks 2, 3, 4, and 5 placed at spaced points on its upper surface, is illustrated. Also shown in FIG. 1 are two fixtures 6 and 7, that are used to support detachable machine legs 8 and 9 in a predetermined position above platform 1. Only two of the legs 8 and two of the legs 9 are shown in FIG. 1 to simplify the drawing, but it will be understood that in practice an additional pair of legs 8 and pair of legs 9 will be supported from fixtures 6 and 7 respectively. The legs 8 and 9 are fastened to their respective fixtures 6 and 7 by bolts or any other suitable, readily detachable, fastening means. Fixtures 6 and 7 need not be of any particular shape, but they must be rigid enough to accurately support the machine legs 8 and 9 above the platform in a predetermined position, for example, exactly level in a single plane or otherwise positioned as the type of bearing support may require for the alignment desired.

In utilizing our method to mount the machines of a motor-generator set on platform 1, measurements are taken to determine a desired centralized location for fixture positioning holes 10, then these holes are drilled in platform 1. The fixture 6 has two integral legs 11 (shown in FIG. 6) projecting from its bottom surface, and these legs are inserted into the holes 10 thereby accurately to position fixture 6 in the desired centralized location on platform 1. Jacks 12 are provided on fixture 6 to adjust the fixture until it is exactly leveled in a predetermined position above the platform 1. Of course, any ony other suitable means may be used to level the fixture. Legs 8, which have their upper or machine-supporting surfaces machined to a plane such that they will exactly mate with the support surfaces on the generator 13 (shown in FIG. 7), are then bolted to the flanges 14 on fixture 6. These flanges in turn have their lower surfaces 15 machined to a plane such that they exactly mate with the machined surfaces on legs 8. Also, all four of the flanges 14 are machined so that their lower surfaces 15 are in a common plane. The legs 8 are thus supported by the fixture 6 in a predetermined position in a common plane above the platform 1. It will be understood that legs 8 may be bolted to flanges 14 prior to positioning fixture 6 on platform 1 if such a sequence is found to be desirable.

After the legs 8 have been positioned above platform 1, metal blocks 2 and 3 are positioned on platform 1 by being moved into juxtaposition with the lower sides of each of the legs 8 thereby affording a "slip joint" for adjusting the relationship between the legs and blocks before welding for allowing any vertical adjustment of the legs that may be necessary. The blocks in the adjusted position are then tack welded to platform 1. Fixture 6 is then removed from platform 1 to facilitate the welding of the metal blocks 2 and 3 to the platform 1 and this welding operation is performed. Fixture 6 is then repositioned on platform 1 in such a manner that the legs 8 are again suspended in the desired predetermined position above the platform 1 and in juxtaposition to metal blocks 2 and 3. Then the legs 8 are welded to the metal blocks 2 and 3 by the carefully controlled welding sequence outlined below. By using blocks 2 and 3, the necessity of building up a large welded fillet between the legs 8 and the platform is obviated; therefore, heat stresses resulting from the welding operation are reduced to a minimum. With the type of fixture 6 we have illustrated, it is possible to weld legs 8 to blocks 2 and 3 while the legs 8 are fastened to the fixture 6; however, in employing our mounting method to mount heavy machines that require strong and relatively large welds to support their legs in position we have found it desirable to simply tack weld legs 8 to blocks 2 and 3 to support them in position and then to remove fixture 6 from the legs and remove it from platform 1. Easy access is thus afforded to both sides of the legs 8 so that they may be more readily welded to the blocks 2 and 3, and the legs are thus freed so they may move in response to the heat stresses caused by the welding operation.

In order to prevent the machined surfaces on legs 8 from being moved out of a predetermined common plane despite expansions and contractions resulting from the welding operation, it is necessary to use a carefully controlled welding sequence. Referring particularly to FIG. 2, which is a perspective view of a leg 8 welded to two blocks 2 and 3, a welding sequence, by which the leg 8 can be welded to the blocks 2 and 3 without causing its machined support surface to be moved more than a given tolerance distance out of a plane common to the support surfaces of the other legs 8 by the welding operation, will be described. It will be understood that each of the legs 8 may be vertically displaced by the heat stresses out of the predetermined position in which they were placed by fixture 6; however, the support surfaces of each leg 8 will not be moved more than a given small tolerance distance out of a plane common to the support surfaces of each of the other legs 8. In the preferred form of our method, we form depressions or grooves 16 (best seen in FIGS. 2 and 3) along that upper edge of the blocks 2 and 3 that is in juxtaposition to leg 8. These grooves 16 provide a welding surface which will result in the formation of a joint in which the horizontal heat stresses greatly exceed the vertical heat stresses, so the tendency toward vertical displacement of leg 8 by the heat stresses of the welding operation is reduced to a minimum. It will be understood that the grooves 16 may be formed in blocks 2 and 3 prior to positioning the blocks on platform 1. We prefer this latter sequence.

In welding one of the legs 8 to its corresponding blocks 2 and 3, a weld is simultaneously started at points 17 and 18 respectively on blocks 2 and 3, and these welds are carried, at an equal rate of speed, toward points 19 and 20 respectively. When the two welds have been carried to points 19 and 20, the direction of both welds is reversed and a second pass is made back toward points 17 and 18 respectively, maintaining the same equal rate of welding speed. This sequence is continued until a strong enough weld has been built up in the groove 16 between leg 8 and blocks 2 and 3 to satisfy the load requirements of the leg 8. Subsequently, the remaining three legs 8 are welded to their corresponding blocks 2 and 3 by repeating the above welding sequence on each of them. We have found that by employing a welding sequence similar to that just described, all four legs 8 can be welded to the blocks 2 and 3 without causing the machined support surfaces of any of the legs 8 to be rotated out of the predetermined position in which they were originally placed by fixture 6 by more than a tolerance distance of seven-thousandths of an inch in twelve inches, despite the fact that the support surfaces of all of these legs may be vertically displaced as much as thirty-thousandths of an inch from their original position. The degree of vertical displacement of a given set of legs may be calculated in advance and compensated for when the legs are placed in position by fixture 6.

After the legs 8 have been welded to the blocks 2 and 3, the fixture 6 is unfastened from the legs 8 and removed from the platform 1, and the generator 13 is mounted on the legs 8 and bolted thereto, as is shown in FIG. 7. The generator 13 has support surfaces which are machined to exactly mate with the machined support surfaces on legs 8, and all of these support surfaces are machined to a common plate; therefore, generator 13 will be accurately mounted in a predetermined position above platform 1 when it is fastened to legs 8. It is to be understood that the vertical distance between the center of the generator shaft and the common plane in which the support surfaces of generator 13 lie may vary between limits dependent upon the height of blocks 2 and 3, since such differences can be compensated for by adjusting the position of legs 8 relative to blocks 2 and 3 to thereby position the generator drive shaft 21 in a desired predetermined plane such that it will be aligned with the drive shaft 22 of the motor 23.

Referring more particularly to FIG. 7, the next step in the preferred form of our mounting method for a motor-generator unit is to position fixture 7 on platform 1 in such a manner than an integral disc 24 on fixture 7 will be accurately aligned with the rotatable shaft 21 of generator 13. Any suitable means can be used to accurately measure the position of disc 24 with relation to shaft 21, and we have generally indicated pressure responsive dial gauges 25 and 26 for measuring respectively the radial and the axial relative positions of members 21 and 24 to insure that they are aligned within given tolerance values. Jacks 27 on fixture 7 are used to position the fixture vertically and any suitable means (not shown) may be used to position fixture 7 in a horizontal plane on platform 1. The legs 9, which have upper surfaces machined to a plane surface, are then bolted to legs 28 on fixture 7, which have their lower surfaces machined to a predetermined common plane such that they will exactly mate with the machined surfaces on legs 9. The legs 9 are thus supported in a predetermined position in a common plane above the platform 1. It it is felt desirable, legs 9 may be bolted to fixture legs 28 prior to mounting the fixture 7 on the platform 1. The metal blocks 4 and 5 are then positioned on the platform 1 by being moved into juxtaposition with each of the four sides of legs 9 thereby affording a "slip joint" between the blocks 4 and 5 and legs 9 for adjusting the relationship between the legs and the blocks before welding for allowing any vertical adjustment of the legs that may be necessary. The blocks in the adjusted position are then tack welded to the platform 1. The fixture 7 is then removed from platform 1 and the blocks 4 and 5 are welded to the platform 1 along the entire length of each of their sides, as is shown in FIG. 4. The fixture 7 is then repositioned on platform 1 so that the gauges 25 and 26 have the same reading respectively that they had during its initial positioning on the platform, thereby again to support the legs 9 in the desired predetermined position above platform 1. Legs 9 are then welded to blocks 4 and 5 by a carefully controlled welding sequence, which will not cause the machined support surfaces of the legs to be moved out of the predetermined common plane by more than a given tolerance distance by the heat stresses resulting from the welding operation. This welding sequence is described in detail below. An alternative mounting sequence, such as that mentioned above during the discussion relating to the welding of legs 8 to blocks 2 and 3, may, if desired, be used so that legs 9 would be tack welded to blocks 4 and 5 and then the fixture 7 would be removed to facilitate the welding operation.

The welding sequence that is utilized to weld legs 9 to blocks 4 and 5 will be described with particular reference to FIG. 4. For the reasons explained above in the discussion relating to the welding of legs 8 to blocks 2 and 3, we find it desirable to provide blocks 4 and 5 with grooves 29 (shown in FIG. 4) along that upper edge of the blocks that is in juxtaposition to the legs 9. (A preferred shape of these grooves 29 is shown in FIG. 5.) Welds are simultaneously started at points 30 and 31 between one of the legs 9 and its corresponding blocks 4 and carried to the points 32 and 33 respectively, at an equal rate of welding; then welds are simultaneously started at points 34 and 35 between leg 9 and blocks 5 and carried at an equal rate toward points 32 and 33 respectively. Thereafter, two welds are started simultaneously at point 36, between one block 4 and leg 9, and carried at an equal rate toward point 37 and 38 respectively, then another two welds are simultaneously started at point 39 between the other block 4 and leg 9 and carrier to points 40 and 41 respectively, to thereby complete a welded joint on all four sides of leg 9. The above welding sequence may be repeated as often as is necessary to build up a weld of a given strength between leg 9 and blocks 4 and 5. The remaining three legs 9 are then successively welded to their respective blocks 4 and 5 by repeating the above sequence on each of them. We have found that by employing such a welding sequence, all four legs 9 can be welded to their respective blocks 4 and 5 without causing the machined support surfaces of any of the legs 9 to be rotated out of the plane common to the machined support surfaces of each of the other legs 9, in which they were originally placed by the fixture 7, by more than two-thousandths of an inch over eight inches, despite the fact that the support surfaces of all of these legs may be vertically displaced as much as thirty-thousandths of an inch from their original position. As noted above, the degree of vertical displacement can be calculated in advance and compensated for when the legs 9 are originally adjusted into position by fixture 7.

After all four of the legs 9 have been welded to the blocks 4 and 5 in the above manner, a motor 23 is mounted on the legs 9 and rigidly fastened thereto as is shown in FIG. 8. The motor 23 has support surfaces which are machined to exactly mate with the machined support surfaces on legs 9, and these support surfaces on motor 23 are machined to a common plane; therefore, motor 23 will be accurately mounting in a predetermined position, with its support surfaces in a common plane, when it is fastened to legs 9. Due to the fact that the legs 9 were accurately positioned with relation to generator 13 by the fixture 7, and rigidly fixed in this position by the carefully controlled welding sequence outlined above, the motor 23 will have its shaft 22 in exact alignment, within the given tolerance distances noted above, with the shaft 21 of generator 13; therefore, these two machines can be coupled together and operated without any shims being required to further align them to prevent undue vibration. Such vibration would occur if the machines were not accurately mounted within the given tolerance distances. As noted above during the discussion of the positioning of the machined support surfaces on generator 13, the vertical displacement between the drive shaft of motor 23 and the common plane in which its support surfaces lie may vary within limits determined by the height of blocks 4 and 5, since the fixture 7 positions legs 9 with relation to blocks 4 and 5 to compensate for such variations and thus align the shaft of motor 23 with the shaft of generator 13.

While we have shown and described particular embodiments of our machine mounting method, it will be obvious to those skilled in the art that various modifications may be made without departing from our invention in its broader aspects. For instance, other leg configurations than the two illustrated above may be used. Also, if small machines are being mounted, our mounting method may be readily practiced by using such machines, in place of the fixtures which we described above, to support leg members above a mounting platform while the leg members are being welded to metal "slip joint" blocks on the platform. Furthermore, it will be apparent to those skilled in the art that while it is often expedient, it is not necessary to provide detachable legs for a machine to successfully employ our method in mounting the machine on a platform. To practice our method it is only necessary that a slip joint structure be provided adjacent the legs of a machine so that the legs, which may be either detached from a machine or integral therewith, may be adjusted into a predetermined position above the platform and supported in this position while they are welded to the slip joint structure in such a manner that they will not be moved out of the predetermined position. Of course, the slip joint structure employed need not conform exactly to the embodiments illustrated, but may be of any suitable arrangement that affords a structure which is adapted to telescopically receive the lower ends of machine supporting legs in such a manner that the legs may be readily adjusted in position prior to being welded to the slip joint structure. It will also be readily apparent that our method may be practiced to mount any number of machines on a given platform, although the method was only described in detail above as employed to mount two machines.

What we claim as new and desire to secure by Letters Patent of the United States is:

1. The method of mounting a machine on a platform comprising providing detachable legs for said machine, supporting said legs in a predetermined position above the platform, spacing two metal blocks on the platform by moving one of said blocks into juxtaposition with a first side of one of said legs and moving the other of said blocks into juxtaposition with the opposite side of said leg, repeating the foregoing spacing operation to place blocks in juxtaposition to two opposite sides of each of the remaining legs, welding said blocks to the platform, welding each of the legs to its corresponding pair of blocks without rotating the legs out of the predetermined position by more than a given tolerance distance, and mounting a machine on said legs whereby said machine is mounted in a predetermined position above the platform.

2. The method of mounting a machine on a platform comprising providing detachable legs for said machine, supporting said legs in a predetermined position above the platform, spacing two metal blocks on the platform by moving one of said blocks into juxtaposition with a first side of one of said legs and moving the other of said blocks into juxtaposition with the opposite side of said leg, repeating the foregoing spacing operation to place blocks in juxtaposition to two opposite sides of each of the remaining legs, forming a groove in each of said blocks along that upper edge thereof that is in juxtaposition to the legs whereby a welding surface is formed between the blocks and their corresponding legs that will subject said legs to heat stresses that are of smaller magnitude in a vertical direction than in a horizontal direction, welding said blocks to the platform, welding each of the legs to its corresponding pair of blocks while the legs are supported above the platform without rotating the legs out of the predetermined position by more than a given tolerance distance, and mounting a machine on said legs whereby said machine is mounted in a predetermined position above the platform.

3. The method of mounting a machine on a platform comprising providing detachable legs for said machine, providing a fixture to afford means for supporting said legs in a predetermined position above the platform, attaching said legs to said fixture, adjusting the position of said fixture on the platform whereby the legs are supported in said predetermined position, spacing a plurality of metal blocks on the platform by moving one of said blocks into juxtaposition with a first side of one of said legs and moving a second block into juxtaposition with the opposite side of said leg, repeating the foregoing spacing operation to place metal blocks in juxtaposition to two opposite sides of each of the remaining legs, welding said blocks to the platform, welding each of the legs to its corresponding blocks without rotating the legs out of the predetermined position by more than a given tolerance distance, removing the fixture from the legs, and mounting the machine on said legs whereby said machine is mounted within said given tolerance distance of a predetermined position above the platform.

4. The method of mounting a machine on a platform comprising providing detachable legs for said machine having lower ends that are rectangular in cross section; supporting said legs in a predetermined position above said platform; spacing a plurality of metal blocks on the platform by moving one of said blocks into juxtaposition to a first side of one of said legs, and placing a second, third, and fourth block respectively into juxtaposition with the second, third and fourth sides of said leg; repeating the foregoing spacing operation to place metal blocks in juxtaposition to each of the four sides of each of the remaining legs; welding said blocks to the platform; removing that upper edge of each block that is in juxtaposition to a leg whereby a groove is formed between said leg and each of its corresponding blocks; simultaneously welding two of the blocks that are on opposite sides of one of the legs to said leg by starting a weld at each of two diagonally opposite corners of said leg and welding at an equal rate of speed along one half of the length of said blocks; starting a weld from each of the two remaining diagonally opposite corners of the leg and welding the other half of the length of said leg to the two blocks; starting two welds at the centers of the grooves in each of the remaining two blocks and welding toward the corners of the leg at an equal rate of speed to thereby weld said blocks to the leg along their full length whereby the leg is welded to the blocks without being moved out of the predetermined position by more than a given tolerance distance; successively repeating the foregoing sequence of welding operations on each of the remaining legs and the blocks in juxtaposition thereto; and mounting the machine on said legs whereby said machine is mounted within a given tolerance distance of a predetermined position upon the platform.

5. The method of mounting a machine on a platform comprising providing detachable legs for said machine having lower ends that are rectangular in cross section; supporting said legs in a predetermined position above said platform; spacing a plurality of metal blocks on the platform by moving one of said blocks into juxtaposition to a first side of one of said legs, and placing a second block into juxtaposition with the opposite side of said leg; repeating the foregoing spacing operation to place metal blocks in juxtaposition to each of two opposite sides of each of the remaining legs; welding said blocks to the platform; simultaneously welding two of the blocks to one of the legs by starting a weld at each of two diagonally opposite corners of said leg and welding at an equal rate along the full length of the joints between the leg and the blocks; starting a weld from each of the two remaining diagonally opposite corners of the leg and welding over the original weld in a reverse direction; repeating the two foregoing welding operations until a bead of a desired thickness is built up whereby the leg is welded to the blocks without being moved out of the predetermined position by more than a given tolerance distance; successively repeating the foregoing welding operation on each of the remaining legs and the blocks in juxtaposition thereto; and mounting the machine on said legs whereby said machine is mounted, within a given tolerance distance, in a predetermined position above the platform.

6. The method of mounting a machine having a plurality of legs on a platform comprising supporting said machine in a predetermined position above the platform, spacing two metal blocks on the platform by moving one of said blocks into juxtaposition with a first side of one of said legs and moving the other of said blocks into juxtaposition with the opposite side of said leg, repeating the foregoing spacing operation to place blocks in juxtaposition to two sides of each of the remaining legs, welding said blocks to the platform, and welding each of the legs to its corresponding pair of blocks without moving the machine out of the predetermined position by more than a given tolerance distance whereby said machine is mounted in a predetermined position above the platform.

7. The method of mounting a machine having a plurality of legs on a platform comprising supporting the machine in a predetermined position above the platform, providing means defining a slip joint structure in juxtaposition to four sides of each of the legs, and welding each of the legs to its corresponding slip joint structure without moving the machine out of the predetermined position by more than a given tolerance distance whereby said machine is mounted in a predetermined position above the platform.

8. The method of mounting a machine on a platform comprising providing detachable legs for said machine, supporting said legs in a predetermined position above the platform, providing means defining a slip joint structure in juxtaposition to at least two sides of each of the legs, welding each of the legs to its corresponding slip joint structure without moving said legs out of the predetermined position by more than a given tolerance distance, and mounting a machine on said legs whereby said machine is mounted in a predetermined position above the platform.

References Cited in the file of this patent
UNITED STATES PATENTS
1,893,699   Dunning _____ Jan. 10, 1933